United States Patent
Wang et al.

(10) Patent No.: US 12,116,464 B2
(45) Date of Patent: Oct. 15, 2024

(54) FIBER REINFORCED COMPOSITION WITH GOOD IMPACT PERFORMANCE AND FLAME RETARDANCE

(71) Applicant: SHPP Global Technologies B.V., Bergen op Zoom (NL)

(72) Inventors: Qin Wang, Shanghai (CN); Reema Sinha, Bangalore (IN); Jian Yang, Shanghai (CN)

(73) Assignee: SHPP Global Technologies B.V., Bergen op Zoom (NL)

(*) Notice: Subject to any disclaimer, the term of this patent is extended or adjusted under 35 U.S.C. 154(b) by 865 days.

(21) Appl. No.: 17/047,117

(22) PCT Filed: Apr. 11, 2019

(86) PCT No.: PCT/IB2019/053010
§ 371 (c)(1),
(2) Date: Oct. 13, 2020

(87) PCT Pub. No.: WO2019/198037
PCT Pub. Date: Oct. 17, 2019

(65) Prior Publication Data
US 2021/0155765 A1   May 27, 2021

(30) Foreign Application Priority Data
Apr. 13, 2018 (EP) ..................................... 18167243

(51) Int. Cl.
*C08J 5/08* (2006.01)
*C08L 69/00* (2006.01)

(52) U.S. Cl.
CPC ................. *C08J 5/08* (2013.01); *C08L 69/00* (2013.01); *C08J 2369/00* (2013.01); *C08J 2469/00* (2013.01); *C08J 2483/14* (2013.01); *C08L 2201/02* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| 8,841,367 B2 | 9/2014 | Zheng et al. |
| 9,234,312 B2 | 1/2016 | Kikuta et al. |
| 2015/0183986 A1 | 7/2015 | Kim et al. |
| 2016/0347952 A1 | 12/2016 | Schwartz et al. |

FOREIGN PATENT DOCUMENTS

| CN | 101845755 A | * | 9/2010 |
| CN | 102459728 A |   | 5/2012 |
| CN | 102575095 A |   | 7/2012 |
| CN | 103328400 A |   | 9/2013 |
| CN | 103790019 A |   | 5/2014 |
| CN | 104497260 A | * | 4/2015 |
| CN | 104736759 A |   | 6/2015 |
| CN | 104884511 A |   | 9/2015 |
| CN | 105051110 A |   | 11/2015 |
| EP | 0304837 B1 | * | 12/1993 |
| EP | 2977409 A1 |   | 1/2016 |
| JP | 3623586 A | * | 2/2005 |
| JP | 3691173 B2 | * | 8/2005 |
| JP | 2013-067915 A |   | 4/2013 |
| WO | WO 2013/099707 A1 |   | 7/2013 |
| WO | WO 2015/039038 A1 |   | 3/2015 |
| WO | WO 2017/187384 A1 |   | 11/2017 |

OTHER PUBLICATIONS 1 page brochure for glass fiber 307AT by Google search on Feb. 7, 2024.*
European Patent Application No. 18167243.7; Extended Search Report; dated Oct. 17, 2018; 6 pages.
International Patent Application No. PCT/IB2019/053010; Int'l Search Report and the Written Opinion; dated Jul. 23, 2019; 11 pages.
International Patent Application No. PCT/IB2019/053010; Int'l Preliminary Report on Patentability; dated Oct. 22, 2020; 7 pages.
Thomas et al.; "Synthesis of (6-isocyanaton-hexyl)carbamoyloxyethyl-methacrylate and its uses as sizing-agent for carbon fiber composite materials cured by electron beam"; Polymer Bulletin; vol. 29; 1992; p. 259-264 (abstract only).

* cited by examiner

*Primary Examiner* — Tae H Yoon
(74) *Attorney, Agent, or Firm* — Quicker Law, LLC (57) ABSTRACT

A composition includes a polymer base resin, a fiber filler including a sizing agent component, and an additive. The sizing agent component includes a sizing agent and a reactive aid. The composition exhibits a notched Izod impact strength of 140 to 190 J/m, and an unnotched impact strength of 500 to 1200 J/m when tested in accordance with ASTM D256.

15 Claims, 4 Drawing Sheets

FIBER REINFORCED COMPOSITION WITH GOOD IMPACT PERFORMANCE AND FLAME RETARDANCE

CROSS-REFERENCE TO RELATED APPLICATION

This application is the National Stage of International Application No. PCT/IB2019/053010 filed Apr. 11, 2019, which claims priority to and the benefit of European Application No. 18167243.7 filed Apr. 13, 2018, the disclosures of which are incorporated herein by this reference in their entireties.

FIELD OF THE DISCLOSURE

The disclosure relates to fiber-filled polymer compositions, specifically sized fiber-filled polymer compositions.

BACKGROUND OF THE DISCLOSURE

Reinforcing fibers can be used to alter the physical properties of a given thermoplastic resin. Depending upon the base resin profile, these fillers can improve certain physical properties of a given polymer composition. Conventional glass-fiber fillers, however, may negatively affect impact properties (such as ductility) and flame retardance of the thermoplastic resin after use in certain manufacturing processes.

These and other shortcomings are addressed by aspects of the present disclosure.

SUMMARY

Aspects of the present disclosure relate to a polymer base resin; a fiber filler comprising a sizing agent component; and an additive, wherein a molded article formed from the composition exhibits a notched Izod impact strength of 140 to 190 Joules/meter (J/m), and an unnotched impact strength of 500 to 1200 J/m when tested in accordance with ASTM D256.

Other aspects of the present disclosure relate to a composition comprising from about 15 wt. % to about 89.5 wt. % of a polymer base resin, from about 10 wt. % about 80 wt. % of a fiber filler comprising a sizing agent component, and from about 0.5 wt. % to about 20 wt. % of an additive. The sizing agent component may comprise a sizing agent and a reactive aid, wherein the sizing agent is present in an amount of from about 0.5 wt. % to 10 wt. % based on weight of the fiber filler, and wherein the reactive aid is present in an amount of 1% to about 30% based on the weight of the sizing agent.

Aspects relate to methods of forming the composition.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

DETAILED DESCRIPTION

Amorphous resins, such as polycarbonate, have good ductility and very low shrinkage making them desirable for use in the consumer electronics market. Various applications in the field may require high modulus and ductility performance. The performance of fiber filled composition can be a function of many different factors. Fibrous fillers, such as glass fiber, carbon fiber, or basalt fiber, are often in high loadings to provide high modulus to the amorphous resin. However, the fiber however may negatively affect ductility and impact strength. Compositions of the present disclosure demonstrate that the strength of fiber filled material may highly depend on the interphase (coupling or connection) between a polymer resin and reinforcing fiber. In one aspect, the present disclosure relates to a composition comprising a polymer base resin, a fiber filler comprising a sizing agent component, and an additive. The compositions of the present disclosure may provide filled thermoplastic compositions exhibiting good mechanical performance (particularly, ductility), and good flame retardancy.

The disclosed composition may exhibit a notched Izod impact strength of 140 J/m to 190 J/m and an unnotched impact strength of 500 J/m to 1200 J/m when tested in accordance with D256.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Polymer Base Resin

In one aspect, the disclosed thermoplastic compositions include a polymeric base resin. In some aspects the polymeric base resin includes polybutylene terephthalate (PBT), polyethylene terephthalate (PET), polyamide (PA), polycarbonate (PC), poly(p-phenylene oxide) (PPO), or combinations of one or more of these polymers. In particular aspects the polymeric base resin may include PC, PC copolymers, PBT, PET and PC, PA, PO, or PA and PPO. The polymer base resin may have certain functional moieties that promote interaction with the sized fiber filler of the present disclosure. For example, the polymer base resin may have functional moieties such as hydroxyl, carboxyl, thiol, amine, and epoxy.

As used herein, polybutylene terephthalate can be used interchangeably with poly(1,4-butylene terephthalate). Polybutylene terephthalate is one type of polyester. Polyesters, which include poly(alkylene dicarboxylates), liquid crystalline polyesters, and polyester copolymers, can be useful in the disclosed thermoplastic compositions of the present disclosure.

Polyesters have repeating units of the following formula (A):

(A)

wherein T is a residue derived from a terephthalic acid or chemical equivalent thereof, and D is a residue derived from polymerization of an ethylene glycol, butylene diol, specifically 1,4-butane diol, or chemical equivalent thereof. Chemical equivalents of diacids include dialkyl esters, e.g., dimethyl esters, diaryl esters, anhydrides, salts, acid chlorides, acid bromides, and the like. Chemical equivalents of ethylene diol and butylene diol include esters, such as dialkylesters, diaryl esters, and the like.

In addition to units derived from a terephthalic acid or chemical equivalent thereof, and ethylene glycol or a butylene diol, specifically 1,4-butane diol, or chemical equivalent thereof, other T and/or D units can be present in the polyester, provided that the type or amount of such units do not significantly adversely affect the desired properties of the thermoplastic compositions.

Examples of aromatic dicarboxylic acids include 1,4-naphthalenedicarboxylic acid, 1,5-naphthalenedicarboxylic acid, 2,6-naphthalenedicarboxylic acid, and combinations comprising at least one of the foregoing dicarboxylic acids. Exemplary cycloaliphatic dicarboxylic acids include norborene dicarboxylic acids, 1,4-cyclohexanedicarboxylic acids, and the like. In a specific aspect, T is derived from a combination of terephthalic acid and isophthalic acid wherein the weight ratio of terephthalic acid to isophthalic acid is 99:1 to 10:90 (or about 99:1 to about 10:90), specifically 55:1 to 50:50 (or about 55:1 to about 1:1).

Examples of C6-C12 aromatic diols include, but are not limited to, resorcinol, hydroquinone, and pyrocatechol, as well as diols such as 1,5-naphthalene diol, 2,6-naphthalene diol, 1,4-naphthalene diol, 4,4'-dihydroxybiphenyl, bis(4-hydroxyphenyl)ether, bis(4-hydroxyphenyl)sulfone, and the like, and combinations comprising at least one of the foregoing aromatic diols.

Exemplary C2-C12 aliphatic diols include, but are not limited to, straight chain, branched, or cycloaliphatic alkane diols such as propylene glycol, i.e., 1,2- and 1,3-propylene glycol, 2,2-dimethyl-1,3-propane diol, 2-ethyl-2-methyl-1, 3-propane diol, 1,4-but-2-ene diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol, including its cis- and trans-isomers, triethylene glycol, 1,10-decanediol; and combinations comprising at least of the foregoing diols.

In another aspect, the compositions of the present disclosure can include polyesters including, for example, aromatic polyesters, poly(alkylene esters) including poly(alkylene arylates), and poly(cycloalkylene diesters). Aromatic polyesters can have a polyester structure according to formula (A), wherein D and T are each aromatic groups as described hereinabove. In an aspect, useful aromatic polyesters can include, for example, poly(isophthalate-terephthalate-resorcinol)esters, poly(isophthalate-terephthalate-bisphenol A)esters, poly[(isophthalate-terephthalate-resorcinol)ester-co-(isophthalate-terephthalate-bisphenol A)]ester, or a combination comprising at least one of these. Also contemplated are aromatic polyesters with a minor amount, e.g., about 0.5 to about 10 wt. %, based on the total weight of the polyester, of units derived from an aliphatic diacid and/or an aliphatic polyol to make copolyesters. Poly(alkylene arylates) can have a polyester structure according to formula (A), wherein T comprises groups derived from aromatic dicarboxylates, cycloaliphatic dicarboxylic acids, or derivatives thereof.

Examples of specifically useful T groups include, but are not limited to, 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene)dimethylene.

Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations including at least one of the foregoing polyesters can also be used.

Copolymers including alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer includes greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexane-dimethanol-1,4-cyclohexanedicarboxylate) (PCCD), having recurring units of formula (B):

(B)

wherein, as described using formula (A), D is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

Polyesters, including polybutylene terephthalate, can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). The condensation reaction may be facilitated by the use of a catalyst, with the choice of catalyst being determined by the nature of the reactants. The various catalysts for use herein are very well known in the art and are too numerous to mention individually herein. Generally, however, when an alkyl ester of the dicarboxylic acid compound is employed, an ester interchange type of catalyst is preferred, such as Ti(OC$_4$H$_9$)$_6$ in n-butanol.

It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

In another aspect, the composition can further comprise poly(1,4-butylene terephthalate) or "PBT" resin. PBT can be obtained by polymerizing a glycol component of which at least 70 mol %, preferably at least 80 mol %, consists of tetramethylene glycol and an acid or ester component of which at least 70 mol %, preferably at least 80 mol %, consists of terephthalic acid and/or polyester-forming derivatives therefore. Commercial examples of PBT include those available under the trade names VALOX™ 315, VALOX™ 195 and VALOX™ 176, manufactured by SABIC™, having an intrinsic viscosity of 0.1 deciliters per gram (dl/g) to about 2.0 dl/g (or 0.1 dl/g to 2 dl/g) as measured in a 60:40 phenol/tetrachloroethane mixture or similar solvent at 23 degrees Celsius (° C.) to 30° C. In one aspect, the PBT resin has an intrinsic viscosity of 0.1 dl/g to 1.4 dl/g (or about 0.1 dl/g to about 1.4 dl/g), specifically 0.4 dl/g to 1.4 dl/g (or about 0.4 dl/g to about 1.4 dl/g).

As used herein, poly(p-phenylene oxide) can be used interchangeably with poly(p-phenylene ether) or poly (2,6 dimethyl-p-phenylene oxide). Poly(p-phenylene oxide) may be included by itself or may be blended with other polymers, including but not limited to polystyrene, high impact styrene-butadiene copolymer and/or polyamide.

As used herein, polycarbonate refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates. Polycarbonates, and combinations comprising thereof, may also be used as the polymer base resin. As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates. The terms "residues" and "structural units", used in reference to the constituents of the polymers, are synonymous throughout the specification. In certain aspects the polycarbonate polymer is a Bisphenol-A polycarbonate, a high molecular weight (Mw) high flow/ductile (HFD) polycarbonate, a low Mw HFD polycarbonate, or a combination thereof.

The terms "BisA," "BPA," or "bisphenol A," which can be used interchangeably, as used herein refers to a compound having a structure represented by formula (C):

(C)

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

In addition to the polycarbonates described above, combinations of the polycarbonate with other thermoplastic polymers, for example combinations of homopolycarbonates, copolycarbonates, and polycarbonate copolymers with polyesters, can be used. For example, useful polyesters include, but are not limited to, poly(alkylene dicarboxylates), liquid crystalline polyesters, and polyester copolymers as described herein. The polyesters described herein can generally be completely miscible with the polycarbonates when blended.

In a specific example, the polycarbonate is a copolymer. The copolymer may comprise repeating units derived from BPA. In yet a further example, the copolymer comprises repeating units derived from sebacic acid. More specifically, the copolymer may comprise repeating units derived from sebacic acid and BPA. Useful polycarbonate copolymers are commercially available and include, but are not limited to, those marketed under the trade names LEXAN™ EXL and LEXAN™ HFD polymers available from SABIC™.

In further aspects, the polymeric base resin may comprise a polycarbonate-polysiloxane copolymer. Non-limiting examples of polycarbonate-polysiloxane copolymers may comprise various copolymers available from SABIC. In an aspect, the polysiloxane-polycarbonate copolymer can contain 6% by weight polysiloxane content based upon the total weight of the polysiloxane-polycarbonate copolymer. In various aspects, the 6% by weight polysiloxane block copolymer can have a weight average molecular weight (Mw) of from about 23,000 to 24,000 Daltons using gel permeation chromatography with a bisphenol A polycarbonate absolute molecular weight standard. In certain aspects, the 6% weight siloxane polysiloxane-polycarbonate copolymer can have a melt volume flow rate (MVR) of about 10 cubic centimeters per 10 minutes (cm$^3$/10 min) at 300° C./1.2 kilogram (kg) (see for example, C9030T, a 6% by weight polysiloxane content copolymer available from SABIC™ as "transparent" EXL C9030T resin polymer). In another example, the polysiloxane-polycarbonate block can comprise 20% by weight polysiloxane based upon the total weight of the polysiloxane block copolymer. For example, an appropriate polysiloxane-polycarbonate copolymer can be a bisphenol A polysiloxane-polycarbonate copolymer endcapped with para-cumyl phenol (PCP) and having a 20% polysiloxane content (see C9030P, commercially available from SABIC™ as the "opaque" EXL C9030P). In various aspects, the weight average molecular weight of the 20% polysiloxane block copolymer can be about 29,900 Daltons to about 31,000 Daltons when tested according to a polycarbonate standard using gel permeation chromatography (GPC) on a cross-linked styrene-divinylbenzene column and calibrated to polycarbonate references using a UV-VIS detector set at 264 nanometer (nm) on 1 milligram per milliliter (mg/ml) samples eluted at a flow rate of about 1.0 ml/minute. Moreover, the 20% polysiloxane block copolymer can have an MVR at 300° C./1.2 kg of 7 cm$^3$/10 min and can exhibit siloxane domains sized in a range of from about 5 micron to about 20 micrometers (microns, μm).

As used herein, a polyamide is a polymer having repeating units linked by amide bonds, and can include aliphatic polyamides (PA) (e.g., the various forms of nylon such as nylon 6 (PA6), nylon 66 (PA66) and nylon 9 (PA9)), polyphthalamides (e.g., PPA/high performance polyamide) and aramides (e.g., para-aramid and meta-aramid).

In a further aspect, the polymeric base resin can have a weight average molecular weight from 30,000 Daltons to 150,000 Daltons, or from about 30,000 Daltons to about 150,000 Daltons.

A mixture of polymeric base resins with differing viscosities can be used to make a blend of two or more polymeric base resins to allow for control of viscosity of the final thermoplastic composition.

In some aspects, the polymer base resin can be present in the thermoplastic composition in an amount from 20 weight percent (wt. %) to 90 wt. %, or from about 20 wt. % to about 90 wt. %. In other aspects, the polymeric base resin can be present in an amount from 30 wt. % to 80 wt. % or from about 30 wt. % to about 80 wt. %, or from 40 wt. % to 70 wt. % or from about 40 wt. % to about 70 wt. %, or from 50 wt. % to 70 wt. % or from about 50 wt. % to about 70 wt. %, or from 55 wt. % to 65 wt. % or from about 55 wt. % to about 65 wt. %.

Fiber Filler

In one aspect, the disclosed thermoplastic compositions comprise a fiber filler. The fiber filler may comprise a fiber filler and sizing component. That is, in some examples, the fiber filler may have a sizing component as a coating such that the fiber filler may be referred to as sized fiber filler. The sizing component may be selected for compatibility with the polymeric base resin. In aspects of the present disclosure, the sizing component comprises a sizing agent and a reactive aid. The sizing component may facilitate wet-out and wet-through of the polymer base resin upon the fiber strands and assists in attaining desired physical properties in the thermoplastic composition.

Suitable fibers include, for example, glass fibers, carbon fibers, basalt fibers, polymeric fibers, metallic fibers, mineral (ceramic, inorganic) fibers and the like. Glass fibers (fiberglass) may be any type of glass, e.g., A glass, E glass, S glass, or D glass. Carbon fibers (which include graphite fibers) are typically prepared by pyrolysis of organic or polymeric fibers (such as PAN). Polymeric fibers include fibers made from any of the known types of thermoplastic polymers such as polyamides, polyolefins, polyaramids, polyesters, poly(p-phenylene-2,6-benzobisoxazole)(PBO), and the like. Suitable metallic fibers include fibers prepared using any type of metal or metal alloy, such as iron, steel, aluminum, aluminum alloys, copper, titanium, nickel, gold, silver and the like. Mineral fibers that can be used in the present disclosure are fibers made from natural or synthetic minerals, refractory oxides or metal oxides and include, but are not limited to, mineral wool, rock wool, stone wool, basalt fibers, alumina fibers, beryllia fibers, magnesia fibers, thoria fibers, zirconia fibers, silicon carbide fibers, quartz fibers, boron fibers, asbestos fibers and high silica fibers and the like. In specific examples, the fiber is glass fiber. In further examples, the fiber is carbon fiber. In yet further examples, the fiber is basalt fiber.

The fiber filler may comprise glass fiber, carbon fiber, basalt fiber, or a combination thereof. A fiber filler such as glass fiber, carbon fiber, or basalt fiber may be sized with the sizing component. In certain examples, the fiber filler comprises a glass fiber.

A glass fiber may be selected from E-glass, S-glass, AR-glass, T-glass, D-glass R-glass, and combinations thereof. In a still further aspect, the glass fiber is one or more S-glass materials. High-strength glass is generally known as S-type glass in the United States, R-glass in Europe and T-glass in Japan. High-strength glass has appreciably higher amounts of silica oxide, aluminum oxide and magnesium oxide than E-glass. S-2 glass is approximately 40-70% stronger than E-glass. The glass fibers can be made by standard processes, e.g., by steam or air blowing, flame blowing, and mechanical pulling. Exemplary glass fibers for thermoplastic compositions of the present disclosure may be made by mechanical pulling. One purely exemplary glass fiber suitable for use in the glass fiber component in an aspect of the disclosure is an E-glass fiber ECS303H, available from Chongqing Polycomp International Corp.

In a further aspect, the glass fiber can be continuous or chopped. In a still further aspect, the glass fiber is continuous. In yet a further aspect, the glass fiber is chopped. Glass fibers in the form of chopped strands may have a length of 0.3 millimeter (mm) to 10 centimeters (cm) or about 0.3 mm to about 10 cm, specifically 0.5 millimeter (mm) to 5 cm or about 0.5 mm to about 5 cm, and more specifically 1 mm to 2.5 cm, or about 1.0 millimeter to about 2.5 centimeters. In various further aspects, the glass fiber has a length from 0.2 mm to 20 mm or about 0.2 mm to about 20 mm. In a yet further aspect, the glass fiber has a length from 0.2 mm to 10 mm, or from about 0.2 mm to about 10 mm. In an even further aspect, the glass fiber has a length from 0.7 mm to 7 mm, or from about 0.7 mm to about 7 mm.

In various further aspects, the glass fiber has a round (or circular), flat, or irregular cross-section. Thus, use of non-round fiber cross sections is possible. In a still further aspect, the glass fiber has a circular cross-section. In yet further aspect, the diameter of the glass fiber is from 1 micrometer (micron, μm) to 15 μm, or from about 1 μm to about 15 μm. In an even further aspect, the diameter of the glass fiber is from 4 μm to 10 μm or from about 4 μm to about 10 μm. In a still further aspect, the diameter of the glass fiber is from 1 μm to 10 μm or from about 1 to about 10 μm. In a still further aspect, the glass fiber has a diameter from 7 μm to 10 μm or from about 7 μm to about 10 μm.

As provided above, glass fiber having a flat cross-section may be used. A flat glass fiber may have an aspect ratio for the flat cross-section of 2 to 5 or from about 2 to about 5. For example, the flat cross-section glass may have a flat ratio of 4:1.

In some aspects, the fiber filler is present in an amount from greater than 0 wt. % to 60 wt. % or from greater than 0 wt. % to about 60 wt. %. In further aspects, the glass fiber component is present in an amount from 10 wt. % to 60 wt. % or from about 10 wt. % to about 60 wt. %, or from 20 wt. % to 60 wt. % or from about 20 wt. % to about 60 wt. %, or from 20 wt. % to 50 wt. %, or from about 20 wt. % to about 50 wt. %, or from 20 wt. % to 40 wt. % or from about 20 wt. % to about 40 wt. %.

As provided herein, the fiber filler is sized with a sizing component. The sizing component may improve the interphase between the polymer base resin and the fiber filler. In a further aspect, the sizing component is present in an amount from 0.5 wt. % to 10 wt. %, or from about 0.5 wt. % to about 8 wt. %, based on the weight of the glass fibers. In a still further aspect, the sizing component is present in an amount from about 0.1 wt. % to about 2 wt. % based on the weight of the glass fibers.

In aspects of the present disclosure, the sizing component comprises a sizing agent and a reactive aid. The sizing agent may comprise an epoxy resin, a polyurethane resin, a nylon resin, a polypropylene resin, a polyimide resin, phenoxy resin, ethylene/propylene maleic anhydride copolymer resin, or a combination thereof. An exemplary sizing agent may comprise a BPA-epoxy resin.

As provided herein, the sizing component may comprise a reactive aid. More specifically, in some examples, the sizing component may comprise a sizing agent modified with an appropriate reactive aid. The reactive aid may be present in an amount of from about 1 wt. % to about 30 wt. % based on the total weight of the sizing agent.

The reactive aid of the sizing component may comprise a diisocyanate compound or moiety. The diisocyanate may be aliphatic, aromatic, linear, or cyclic, for example. Exemplary diisocyanates include isophorone diisocyanate or hexamethylene diisocyanate. As an example, the sizing component may comprise a mixture of diisocyanate and epoxy.

As a further example, the sizing component comprises a BPA-epoxy and isophorone diisocyanate such that the sizing agent comprises the BPA-epoxy and the reactive aid comprises the isophorone diisocyanate. In a yet further example, the sizing component comprises a BPA-epoxy and a hexamethylene diisocyanate such that the sizing agent comprises the BPA-epoxy and the reactive aid comprises hexamethylene diisocyanate. The foregoing reactive aid examples may provide improved properties when compared to a sized fiber in the absence of a reactive aid as shown in the examples provided herein. Moreover, the sized fiber having hexamethylene diisocyanate as the reactive aid may provide even more improved physical properties (such as impact strength) when compared to the sized fiber having only isophorone diisocyanate as the reactive aid.

The improvement in physical properties may be attributed to the interaction of the sizing component with the polymer base resin. More specifically, the sizing agent and reactive aid promote interaction of the fiber filler with the functional endgroups of the polymer base resin.

In preparing the fiber filler, such as the glass fiber filler the strand may be first formed of filaments and then sized. The amount of sizing employed is generally that amount which is sufficient to bind the glass filaments into a continuous fiber strand and ranges from 0.5 wt. % to 10 wt. %, or from about 0.1 to about 5 wt. %, from 0.1 wt. % to 2 wt. % or from about 0.1 to 2 wt. % based on the weight of the glass fibers. Generally, this may be 1.0 wt. % or about 1.0 wt. % based on the weight of the glass filament. For chopped fiber, the amount of sizing employed is generally that amount which is sufficient to bind the glass filaments and ranges from 1 wt. % to 7 wt. %.

The fiber may be in the form of threads, strands, or rovings, at the time it is sized with the sizing component. After sizing, the fibers may be further processed (e.g., into yarns, threads, strands, rovings, mats, meshes, scrims, woven fabric, non-woven fabric and the like). In one aspect, the fiber is in continuous form (e.g., an unbroken filament, thread, strand or yarn) at the time it is sized, but then converted into discontinuous form by cutting, chopping or other such operation. The discontinuous sized fibers may, for example, be from about 0.5 to about 20 mm in length. The sized fibers may be used, in continuous or discontinuous form, in the manufacture of fiber reinforced composites. Means for applying the sizing composition include, but are not limited to, pads, sprayers, rollers or immersion baths, which allow a substantial amount of the surfaces of the individual filaments of the fiber to be wetted with the sizing composition. The sizing component may be applied to the fibers by dipping, spraying, roll coating, or the like. In one example, the sizing component is applied to the fibers continuously.

Additives

In addition to the foregoing components, the disclosed thermoplastic compositions can optionally include a balance amount of one or more additive materials ordinarily incorporated in thermoplastic compositions of this type, with the proviso that the additives are selected so as to not significantly adversely affect the desired properties of the composition. Combinations of additives can be used. Such additives can be mixed at a suitable time during the mixing of the components for forming the composition. Exemplary and non-limiting examples of additive materials that can be present in the disclosed thermoplastic compositions include one or more of a reinforcing filler, enhancer, acid scavenger, anti-drip agent, antioxidant, antistatic agent, chain extender, colorant (e.g., pigment and/or dye), de-molding agent, flow promoter, flow modifier, lubricant, mold release agent, plasticizer, quenching agent, flame retardant (including for example a thermal stabilizer, a hydrolytic stabilizer, or a light stabilizer), impact modifier, ultraviolet (UV) absorbing additive, UV reflecting additive, UV stabilizer, and laser direct structuring additive.

In an aspect, suitable impact modifiers can include an epoxy-functional block copolymer. The epoxy-functional block copolymer can include units derived from a C2-20 olefin and units derived from a glycidyl (meth)acrylate. Exemplary olefins include ethylene, propylene, butylene, and the like. The olefin units can be present in the copolymer in the form of blocks, e.g., as polyethylene, polypropylene, polybutylene, and the like blocks. It is also possible to use mixtures of olefins, i.e., blocks containing a mixture of ethylene and propylene units, or blocks of polyethylene together with blocks of polypropylene.

In addition to glycidyl (meth)acrylate units, the epoxy-functional block copolymers can further include additional units, for example C1-4 alkyl (meth)acrylate units. In one aspect, the impact modifier is terpolymeric, comprising polyethylene blocks, methyl acrylate blocks, and glycidyl methacrylate blocks. Specific impact modifiers are a co- or terpolymer including units of ethylene, glycidyl methacrylate (GMA), and methyl acrylate. Suitable impact modifiers include the ethylene-methyl acrylate-glycidyl methacrylate terpolymer comprising 8 wt. % or about 8 wt. % glycidyl methacrylate units available under the trade name LOTADER™ AX8900 from Arkema. Another epoxy-functional block copolymer that can be used in the composition includes ethylene acrylate, for example an ethylene-ethylacrylate copolymer having an ethylacrylate content of less than 20%, available from Rohm and Haas (Dow Chemical) under the trade name Paraloid™ EXL-3330. It will be recognized that combinations of impact modifiers may be used. In some aspects, the impact modifier may be present in an amount from greater than 0 wt. % to 10 wt. % or from greater than 0 wt. % to about 10 wt. %. In further aspects, the impact modifier is present in an amount from 0.01 wt. % to 8 wt. % or from about 0.01 wt. % to about 8 wt. %, or from 0.01 wt. % to 7 wt. % or from about 0.01 wt. % to about 7 wt. %, or from 0.01 wt. % to 6 wt. % or from about 0.01 wt. % to about 6 wt. %, or from 2 wt. % to 8 wt. % or from about 2 wt. % to about 8 wt. %, or from 3 wt. % to 7 wt. % or from about 3 wt. % to about 7 wt. %.

In a further aspect, the disclosed thermoplastic compositions can further include an antioxidant or "stabilizer." Numerous stabilizers are known may be used, in one aspect the stabilizer is a hindered phenol, such as Irganox™ 1010, available from BASF. In some aspects, the stabilizer may be present in an amount from greater than 0 wt. % to 5 wt. % or from greater than 0 wt. % to about 5 wt. %. In further aspects, the stabilizer is present in an amount from 0.01 wt. % to 3 wt. % or from about 0.01 wt. % to about 3 wt. %, or from 0.01 wt. % to 2 wt. % or from about 0.01 wt. % to about 2 wt. %, or from 0.01 wt. % to 1 wt. % or from about 0.01 wt. % to about 1 wt. %, or from 0.01 wt. % to 0.05 wt. % or from about 0.01 wt. % to about 0.05 wt. %, or from 0.01 wt. % to 0.02 wt. % or from about 0.01 wt. % to about 0.02 wt. %.

In various aspects, the present disclosure pertains to compositions comprising a polymeric base resin, a glass fiber component, and a laser direct structuring additive. The laser direct structuring additive includes copper chromite black, copper hydroxide phosphate, tin-antimony cassiterite grey or a combination thereof. The laser direct structuring additive may be present in an amount from 0.01 wt. % to 10 wt. % or from about 0.01 wt. % to about 8 wt. %, or from 0.01 wt. % to 6 wt. % or from about 0.01 wt. % to about 5 wt. %, or from 0.01 wt. % to 3 wt. % or from about 0.01 wt. % to about 1 wt. %, or from 2 wt. % to 6 wt. %.

Methods of Manufacture

The thermoplastic compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between 230° C. and 350° C. (or about 230° C. and about 350° C.) in the molten resin composition, although higher temperatures can be used provided that the residence time of the resin in the processing equipment is kept short. In some aspects the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods. For example, the polymeric base resin, and/or other optional components and additives are first blended in a HENSCHEL-Mixer™ high speed mixer. Other low shear processes, including but not limited to hand mixing, can also accomplish this blending. The blend is then fed into the throat of a twin-screw extruder via a hopper, while fiber filler, such as glass fiber, is fed into the extruder by a separate side feeder. Alternatively, at least one of the components can be incorporated into the composition by feeding directly into the extruder at the throat and/or downstream through a sidefeeder. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Properties and Articles

The disclosed fiber-filled compositions provide improved mechanical properties when compared to compositions in the absence of the disclosed sized fiber filler. The disclosed sizing component at a fiber filler such as glass fiber may improve the interphase between the fiber filler and the polymer base resin matrix. The interphase may refer to the coupling or connection between the fiber filler and the polymer base resin. The sizing component comprising the sizing agent and reactive aid provide additional reactive elements that may link resin and fiber, thereby improving the interphase and ultimately improving overall strength of the composition.

As noted herein, the polymer base resin may comprise certain functional endgroups or moieties. These functional endgroups further promote interaction between the polymer base resin and the disclosed sized fiber filler. Exemplary functional endgroups may include hydroxyl, carboxyl, thiol, amine, or epoxy endgroups or a combination thereof.

A molded article formed from the disclosed composition may exhibit a notched Izod impact strength of 140 to 190 J/m when tested in accordance with ASTM D256. The molded article may exhibit an unnotched impact strength of 500 to 1200 J/m when tested in accordance with ASTM D256.

Moreover, the disclosed sized fiber filler may provide improved flame retardance properties where a flame retardant additive is present. It is known in the art that the presence of a flame retardant in the composition may negatively affect impact strength to some degree. The disclosed compositions may exhibit a flame retardance of at least V0 at 1.0 mm when tested in accordance with UL 94 and may exhibit a notched Izod impact strength of 140 to 190 J/m when tested in accordance with ASTM D256.

Flammability tests were performed following the procedure of Underwriter's Laboratory Bulletin 94 entitled "Tests for Flammability of Plastic Materials, UL 94". Several ratings can be applied based on the rate of burning, time to extinguish, ability to resist dripping, and whether or not drips are burning. Bar thicknesses were 0.6 mm or 1.0 mm. Materials can be classified according to this procedure as UL 94 HB (horizontal burn), V0, V1, V2, 5VA and/or 5VB on the basis of the test results obtained for five samples; however, the compositions herein were tested and classified only as V0, V1, and V2, the criteria for each of which are described below. These criteria are dependent upon flame out times (FOTs) and are sensitive to dripping of the molten sample. If the molten sample does not ignite underlying cotton wool (i.e., a non-burning drip, "NB"), it does not affect the flammability rating. Where the molten burning sample does ignite the underlying cotton wool, it is indicated as a burning drip (BD). Individual flame out times of five bars tested with a FOT of 30 seconds or fewer receive a UL94-V1 or UL94-V2 rating. Individual FOTs of fewer than 10 seconds obtain a UL94-V0 rating.

V0: In a sample placed so that its long axis is 180 degrees to the flame, the period of flaming and/or smoldering after removing the igniting flame does not exceed ten (10) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 50 seconds.

V1: In a sample placed so that its long axis is 180 degrees to the flame, the period of flaming and/or smoldering after removing the igniting flame does not exceed thirty (30) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 250 seconds.

V2: In a sample placed so that its long axis is 180 degrees to the flame, the average period of flaming and/or smoldering after removing the igniting flame does not exceed thirty (30) seconds, but the vertically placed samples produce drips of burning particles that ignite cotton. Five bar flame out time is the flame out time for five bars, each lit twice, in which the sum of time to flame out for the first (t1) and second (t2) ignitions is less than or equal to a maximum flame out time (t1+t2) of 250 seconds.

The disclosure pertains to shaped, formed, or molded articles comprising the sized-fiber filled compositions. The thermoplastic compositions can be molded into useful shaped articles by a variety of means such as injection molding, extrusion, rotational molding, blow molding and thermoforming to form articles and structural components of, for example, personal or commercial consumer electronics, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed thermoplastic compositions can be used to form articles such as components of consumer electronics devices.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A composition comprising, consisting of, or consisting essentially of: a polymer base resin; a fiber filler comprising a sizing agent component; and an additive, wherein a molded article formed from the composition exhibits a notched Izod impact strength of 140 to 190 Joules/meter (J/m), and an unnotched impact strength of 500 to 1200 J/m when tested in accordance with ASTM D256.

Aspect 2. The composition of aspect 1, wherein the composition comprises, consists of, or consists essentially of:
from about 15 wt. % to about 89.5 wt. % of the polymer base resin;
from about 10 wt. % about 80 wt. % of the fiber filler, wherein the sizing agent component comprises a sizing agent and a reactive aid, wherein the sizing agent is present in an amount of from about 0.5 wt. % to 10 wt. % based on weight of the fiber filler, and wherein the reactive aid is present in an amount of 1% to about 30% based on the weight of the sizing agent; and
from about 0.5 wt. % to about 20 wt. % of the additive.

Aspect 3. The composition of aspect 1 or aspect 2, wherein the fiber filler comprises glass fiber, carbon fiber, basalt fiber, or a combination thereof.

Aspect 4. The composition of aspect 3, wherein the fiber filler comprises glass fiber.

Aspect 5. The composition according to any of aspects 1-4, wherein the sizing agent content of the fiber is about 0.5 wt. % to 10 wt. % based on the total weight of the glass fibers.

Aspect 6. The composition of any of aspects 1-5, wherein the sizing agent comprises epoxy, polyurethane, nylon, polypropylene, polyimide, phenoxy resin, ethylene/propylene maleic anhydride copolymer resin, or a combination thereof.

Aspect 7. The composition according to any of aspects 1-6, wherein the reactive aid is present in an amount of about of 1 wt. % to about 30 wt. 5 of the sizing agent component.

Aspect 8. The composition according to any of aspects 1-7, wherein the reactive aid comprises a diisocyanate.

Aspect 9. The composition of aspect 7, wherein the reactive aids comprises an aliphatic, aromatic, linear, or cyclic diisocyanate.

Aspect 10. The composition of aspect 8, wherein the diisocyanate comprises isophorone diisocyanate.

Aspect 11. The composition of aspect 8, wherein the diisocyanate comprises hexamethylene diisocyanate.

Aspect 12. The composition according to any of aspects 1-11, wherein the sizing agent component is present in an amount of from about 0.5 wt. % to 10 wt. % based on the total weight of the fiber filler.

Aspect 13. The composition according to any of aspects 1-12, wherein the reactive aid is present in an amount of from about 1 wt. % to 30 wt. % based on the total weight of the sizing agent.

Aspect 14. The composition of aspect 1 or aspect 2, wherein the polymer base resin comprises functional end-groups.

Aspect 15. The composition of aspect 1 or aspect 2, wherein the polymer base resin comprises one or more of hydroxyl, carboxyl, thiol, amine, or epoxy endgroups or a combination thereof.

Aspect 16. The composition of aspect 1 or aspect 2, wherein the polymer base resin comprises polycarbonate, a polycarbonate copolymer, or a mixture thereof.

Aspect 17. The composition of aspect 1 or aspect 2, wherein the polymer base resin comprises polyester resin.

Aspect 18. The composition of aspect 1 or aspect 2, wherein the polymer base resin comprises an aliphatic or aromatic polyamide.

Aspect 19. The composition according to any of aspects 1-18, wherein the reactive aid of the sizing agent component interacts with functional end-groups of the polymer base resin.

Aspect 20. The composition according to any of aspects 1-19, further comprising a flame retardant additive and wherein the composition exhibits a flame retardance of at least V0 at 1.0 mm when tested in accordance with UL 94.

Aspect 21. The composition according to any of aspects 1-20, further comprising a laser direct structuring additive.

Aspect 22. The composition according to aspect 21, wherein the laser direct structuring additive comprises copper chromite black, copper hydroxide phosphate, tin-antimony cassiterite grey or a combination thereof.

Aspect 23. The composition according to aspect 21 or 22, wherein the laser direct structuring additive is present in an amount of from 0.01 wt. % to 10 wt. %.

Aspect 24. The composition according to any of aspects 1-23, wherein the composition comprises from about 20 wt. % to about 80 wt. % of the fiber filler, the fiber filler comprises glass fibers, and the composition has an impact strength that is at least 12% higher than that of a substantially identical reference composition that includes glass fibers that do not include a sizing agent component. A "substantially identical reference composition," as used herein, is a reference composition that includes the same components as the example composition and in the same amounts, except the reference composition includes glass fibers that do not include a sizing agent component (and thus do not include a sizing agent and a reactive aid). For example, if the example composition includes 30 wt. % fiber filler and the fiber filler includes CPIC flat glass fibers (307AT) which include a sizing agent and the IDPI and HDI reactive aids, then a substantially identical reference composition has all of the same components and amounts of components as the example composition except instead of the CPIC flat glass fibers (307AT) it has 30 wt. % glass fibers that do not include a sizing component (such as Nittobo, CSG 3PA-830, flat glass fibers).

Aspect 25. The composition according to aspect 24, wherein the composition has a notched Izod impact strength at 23° C. as tested in accordance with ASTM D256 that is at least 12% higher than that of a substantially identical reference composition that includes glass fibers that do not include a sizing agent component.

Aspect 26. A method of manufacturing an article comprising, consisting of, or consisting essentially of: combining from about 15 wt. % to about 89.5 wt. % of a polymer base resin; from about 10 wt. % about 80 wt. % of a fiber filler with a sizing agent component comprising a reactive aid, wherein the sizing agent component is present in an amount of from about 0.5 wt. % to 10 wt. % based on weight of the fiber filler, and from about 0.5 wt. % to 20 wt. % additives (including flame retardants, laser direct structuring agents, reinforcing agents, stabilizer, etc.) wherein the combining is performed in an extruder.

Aspect 27. A composition comprising, consisting of, or consisting essentially of: a polymer base resin; a fiber filler comprising a sizing agent component; a laser direct structuring additive, and an additive, wherein a molded article formed from the composition exhibits a notched Izod impact strength of 140 to 190 J/m, and an unnotched impact strength of 500 to 1200 J/m when tested in accordance with ASTM D256.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polymeric base resin" includes mixtures of two or more polymeric base resins.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additive materials" means that the additive materials can or cannot be included and that the description includes thermoplastic compositions that both include and that do not include additive materials.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein the terms "weight percent," "wt %," and "wt. %," which can be used interchangeably, indicate the percent by weight of a given component based on the total weight of the composition, unless otherwise specified. That is, unless otherwise specified, all wt. % values are based on the total weight of the composition. It should be understood that the sum of wt. % values for all components in a disclosed composition or formulation are equal to 100.

Certain abbreviations are defined as follows: "g" is grams, "kg" is kilograms, "° C." is degrees Celsius, "min" is minutes, "mm" is millimeter, "MPa" is megapascal.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

In various aspects, the present disclosure pertains to compositions comprising a polymeric base resin, a fiber filler with a sizing component, and a flame retardant additive and/or a laser direct structuring additive.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt. %.

The materials listed in Table 1 were used to prepare comparative and inventive samples.

TABLE 1

Materials.

| | Description | Function |
|---|---|---|
| PC1 | PCP 1300 | Bisphenol A polycarbonate(linear) endcap with para-cumyl phenol with Mw target = 21900 and MVR at 300 C./1.2 kg, of 23.5 to 28.5 g/10 min. |
| PC2 | 100 grade PCP | Bisphenol A polycarbonate(linear) endcap with para-cumyl phenol with Mw target = 29900 and MVR at 300 C/1.2 kg, of 5.1 to 6.9 g/10 min |
| PC3 | Branched THPE, HBN Endcapped PC | Branched polycarbonate-branched with THPE; endcap with p-cyanophenol |
| PC-Silox | 20% PC/Siloxane Copolymer | Bisphenol A polycarbonate-polysiloxane copolymer comprising 20% by weight of siloxane, 80% by weight BPA and endcapped with para-cumyl phenol with Mw target = 28500-30000 grams per mole. |
| HFD PC | Sebacic Acid/BPA copolymer, high flow | PC copolymer |
| HFD PC 2 | Sebacic acid/BPA/PCP copolymer, low flow | PC copolymer |
| GF1 | Nittobo, E-glass fiber, 'flat' cross section CSG 3PA-830 | Glass fiber filler |
| GF2 | CPIC, flat GF, 307AT-old | Glass fiber filler |
| GF3 | CPIC, flat GF, 307AT | Glass fiber filler |
| FR | Phenoxy phosphazene FR additive | Flame retardant |
| TSAN | SAN encapsulated PTFE | Anti-drip agent |
| PETS | Pentaerythritol tetrastearate | Mold release |
| STAB1 | Tris(2,4-di-t-butylphenyl)phosphite | Thermal stabilizer |
| STAB2 | Hindered Phenol Anti-Oxidant 1076 | Thermal stabilizer |
| STAB3 | Mono Zinc Phosphate | Stabilizer |
| STAB4 | Phosphorous acid | Stabilizer |
| STAB5 | Joncryl ADR 4468 | Stabilizer |
| IM | Dimethylpolysiloxane and combination of dimethylpolysiloxane and silicone resin | Impact modifier |
| IM2 | Acrylic polymer impact modifier. | Impact modifier |
| LDS | Copper hydrophosphate | Laser direct structing additive |

Sizing of the glass fiber GF1, GF2, and GF3 are summarized in Table 2.

TABLE 2

Characteristics of sizing agent component at glass fiber.

| | GF1 | GF2 (307AT-old) | GF3 (307AT) |
|---|---|---|---|
| Sizing type | BPA-Epoxy | BPA-Epoxy and IPDI (Isophorone diisocyanate, structure shown below) | BPA-Epoxy, IPDI & HDI (Hexamethylene diisocyanate, structure shown below) |

TABLE 2-continued

Characteristics of sizing agent component at glass fiber.

| GF1 | GF2 (307AT-old) | GF3 (307AT) |
|---|---|---|
| Structure |  |  |

Comparative sample (C1 and C2) and inventive samples (E1-E3), which already have impact modifiers in their formulation, were prepared from the foregoing components.

Table 3 shows the comparative and inventive examples of 10% and 20% GF loaded formulation that embody the claim of this disclosure.

TABLE 3

Properties of samples.

| | Item Description | Unit | C1 | E1 | C2 | E2 | E3 |
|---|---|---|---|---|---|---|---|
| PC1 | PCP 1300 | % | 48.7 | 48.7 | 40.7 | 40.7 | 40.7 |
| PC2 | 100 GRADE PCP | % | 15 | 15 | 15 | 15 | 15 |
| PC3 | Branched THPE, HBN Endcapped PC | | 10 | 10 | 10 | 10 | 10 |
| PC-Silox | 20% PC/Siloxane copolymer | % | 8 | 8 | 6 | 6 | 6 |
| FR | Phenoxy-Phosphazene, FP-110T | % | 6.5 | 6.5 | 6.5 | 6.5 | 6.5 |
| STAB2 | Hindered Phenol Anti-oxidant, 1076 | % | 0.1 | 0.1 | 0.1 | 0.1 | 0.1 |
| STAB1 | Phosphite Stabilizer, Alkanox ™ 240 | % | 0.1 | 0.1 | 0.1 | 0.1 | 0.1 |
| TSAN | SAN capsuled PTFE | % | 0.6 | 0.6 | 0.6 | 0.6 | 0.6 |
| PETS | Pentaerythritol tetrastearate | % | 0.5 | 0.5 | 0.5 | 0.5 | 0.5 |
| IM | dimethyl-pholysiloxan and MQ Resin | | 0.5 | 0.5 | 0.5 | 0.5 | 0.5 |
| GF1 | Nittobo, CSG 3PA-830, flat fiber | % | 10 | | 20 | | |
| GF2 | CPIC, flat GF, 307AT-old | % | | | | 20 | |
| GF3 | CPIC, flat GF, 307AT | % | | 10 | | | 20 |
| Result | | | | | | | |
| Ash-Avg | ASTM, 900° C., 20 min | % | | | | | |
| Density-Avg | Specific gravity, ASTM D792 | g/cm$^3$ | | | | | |
| Flow rate, MFR-Avg | 300° C./1.2 KG, ASTM D1238 | g/10 min | 17.222 | 15.955 | 13.02 | 12.82 | 13.02 |
| | 300° C./2.16 KG, ASTM D1238 | g/10 min | 34.700 | 33.757 | 27.9 | 26.6 | 25.91 |
| Notched Izod impact strength (NII)-Avg | 23° C., ASTM D256 | J/m | 151 | 152 | 148 | 149 | 170 |
| Unnotched Izod impact strength (UNII)-Avg | 23° C., ASTM D256 | J/m | 744 | 785 | 615 | 608 | 617 |
| Heat deflection temperature (HDT)-Avg | 1.82 MPa, 3.2 mm | ° C. | 116 | 117 | 116 | 116 | 117 |
| Flexural Modulus | ASTM D790, 1.27 mm/min | MPa | 4040 | 3930 | 6160 | 6060 | 6070 |

TABLE 3-continued

Properties of samples.

| | Item Description | Unit | C1 | E1 | C2 | E2 | E3 |
|---|---|---|---|---|---|---|---|
| Flexural Stress | ASTM D790 at break | MPa | 133 | 133 | 164 | 163 | 167 |
| Tensile Modulus | ASTM D638, 5 mm/min | MPa | 4341 | 4269 | 6694 | 6768 | 6761 |
| Tensile Stress | ASTM D638 at break | MPa | 83.5 | 83.5 | 109.6 | 111.9 | 112.1 |
| Tensile Elongation | ASTM D638 at break | % | 3.3 | 3.4 | 2.4 | 2.3 | 2.3 |
| Flame out time (10 bars) | UL94, 1.0 mm, normal | seconds | V0 (44.7) | V0 (45) | V0 (44.8) | V0 (49) | V0 (44.2) |
| | UL94, 1.0 mm, aging | seconds | V0 (40.4) | V0 (38.8) | V0 (42.1) | V0 (50) | V0 (43.1) |

MPA = megapascals

Samples C1 to C2 are the comparative reference examples. Samples E1 to E3 are inventive samples demonstrating the novelty of the disclosed compositions. Comparing E1 with C1, no significant impact improvement with the GF with additional reactive sizing in the 10 wt. % GF filled components. Comparing E2, E3 with C2, the 20 wt. % GF filled components with BPA-epoxy sizing agent with reactive aid IDPI (E2), did not show any performance improvement, whereas 20 wt. % GF filled components with BPA-epoxy sizing agent with reactive aids HDI and IDPI (E3) showed a significant notched impact improvement of about 15%.

It is intuitive that more glass fiber in the formulation would have a higher negative effect on the impact performance. However, the examples demonstrate that the special sizing with HDI and IDPI (E3) as reactive aid helps in achieving a more desirable impact strength. This improvement was more prominent for the high GF loading formulations.

Comparative sample (C3) and inventive samples (E4-E5) were prepared from the above components. Table 4 presents the physical properties of each sample.

TABLE 4

Properties of samples.

| Item Code | Item Description | Unit | C3 | E4 | E5 |
|---|---|---|---|---|---|
| PC1 | PCP 1300 | % | 17.2 | 17.2 | 17.2 |
| PC2 | 100 GRADE PCP | % | 18 | 18 | 18 |
| PC-Silox | 20% PC/Siloxane copolymer | % | 6 | 6 | 6 |
| FR | PhenoxyPhosphazene, FP-110T | % | 7 | 7 | 7 |
| STAB2 | Hindered Phenol Anti-oxidant, 1076 | % | 0.1 | 0.1 | 0.1 |
| STAB1 | Phosphite Stabilizer, Alkanox 240 | % | 0.1 | 0.1 | 0.1 |
| TSAN | SAN capsuled PTFE | % | 0.6 | 0.6 | 0.6 |
| PETS | Pentaerythritol tetrastearate | % | 1 | 1 | 1 |
| GF1 | Nittobo, CSG 3PA-830, flat fiber | % | 50 | | |
| GF2 | CPIC, flat GF, 307AT-old | % | | 50 | |
| GF3 | CPIC, flat GF, 307A | % | | | 50 |

TABLE 4-continued

| Result Test Code | Test Description | Unit | 70 | 74 | 75 |
|---|---|---|---|---|---|
| Ash-Avg | ASTM, 900° C., 20 min | % | 51.7 | 51.6 | 51.5 |
| Density-Avg | Specific gravity, ASTM D792 | g/cm³ | 1.63 | 1.64 | 1.63 |
| MFR-Avg | 300° C./5 KG, ASTM D1238 | g/10 min | 135 | 75 | 98.7 |
| | 300° C./2.16 KG, ASTM D1238 | g/10 min | 57 | 28 | 31 |
| NII-Avg | 23° C., ASTM D256 | J/m | 135 | 140 | 164 |
| UNII-Avg | 23° C., ASTM D256 | J/m | 520 | 430 | 624 |
| HDT-Avg | 1.82 MPa, 3.2 mm | ° C. | 102 | 103 | 104 |
| Flexural Modulus | ASTM D790, 1.27 mm/min | MPa | 13700 | 13300 | 12700 |
| Flexural Stress | ASTM D790 at Break | MPa | 227 | 219 | 218 |
| Tensile Modulus | ASTM D638, 5 mm/min | MPa | 15580 | 15420 | 15360 |
| Tensile Stress | ASTM D638 at Break | MPa | 169 | 152 | 164 |
| Tensile Elongation | ASTM D638 at Break | % | 1.7 | 1.4 | 1.6 |
| Flame out time (10 bars) | UL94, 1.0 mm, normal | seconds | V1 (75.9) | V0 (40.9) | V0 (42.2) |
| | UL94, 1.0 mm, aging | seconds | V1 (52.5) | V0 (40) | V0 (41.4) |

In Table 4, the comparative examples of 50 wt. % GF filled composites are shown. The influence of special sizing on the impact property of the composite is more obvious. Comparing E4 and E5 to C3, the GF composites with GF sizing containing reactive agent as only IDPI (E4) does not help or even reduces the unnotched impact performance, while GF composites with GF sizing containing reactive agent as with HDI (E5) gives a significant impact improvement in both notched and unnotched impact of about 20%. The other mechanical properties are very similar to C3.

Additionally both E4 and E5 showed benefit in flame retardant performance, i.e., the significantly reducing the burning time. These 2 samples had improved FR performance (flame out time) at 1.0 mm.

Figure 1:
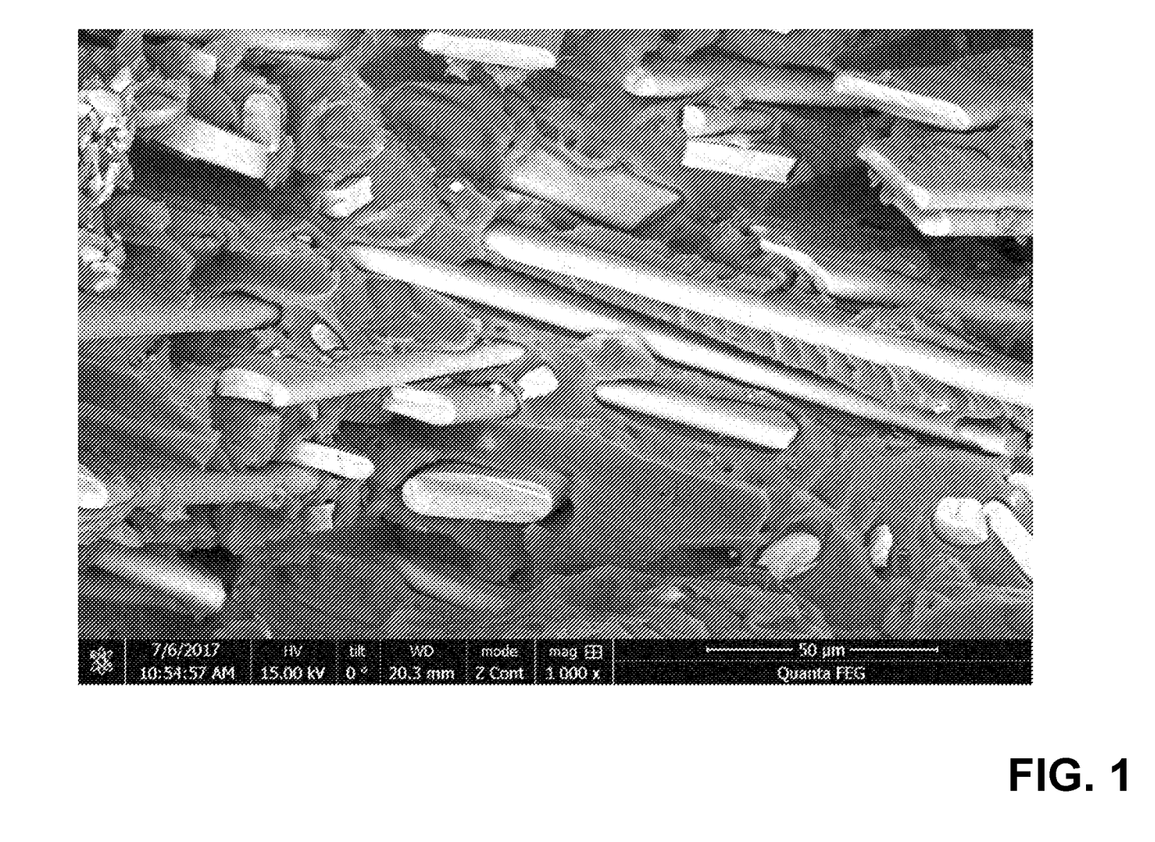
FIG. 1 is a scanning electron micrography (SEM) image of a comparative glass fiber and polymer base resin composition.
Figure 2:
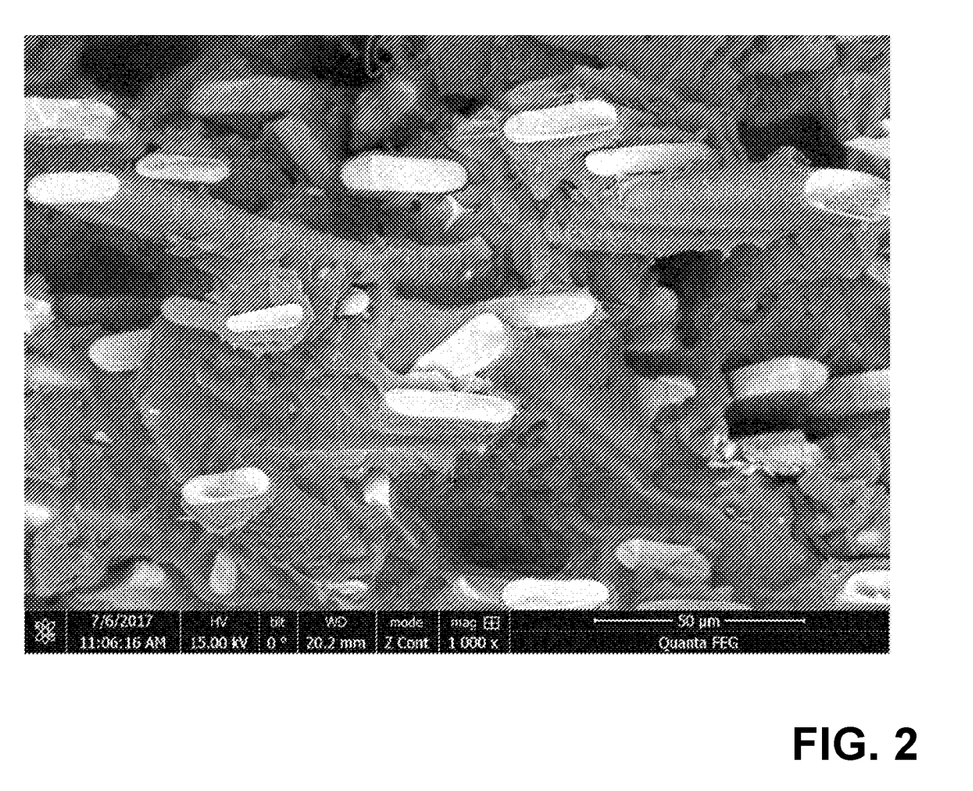
FIG. 2 is a SEM image of an inventive glass fiber and polymer base resin composition according to an aspect of the disclosure.
Figure 3:
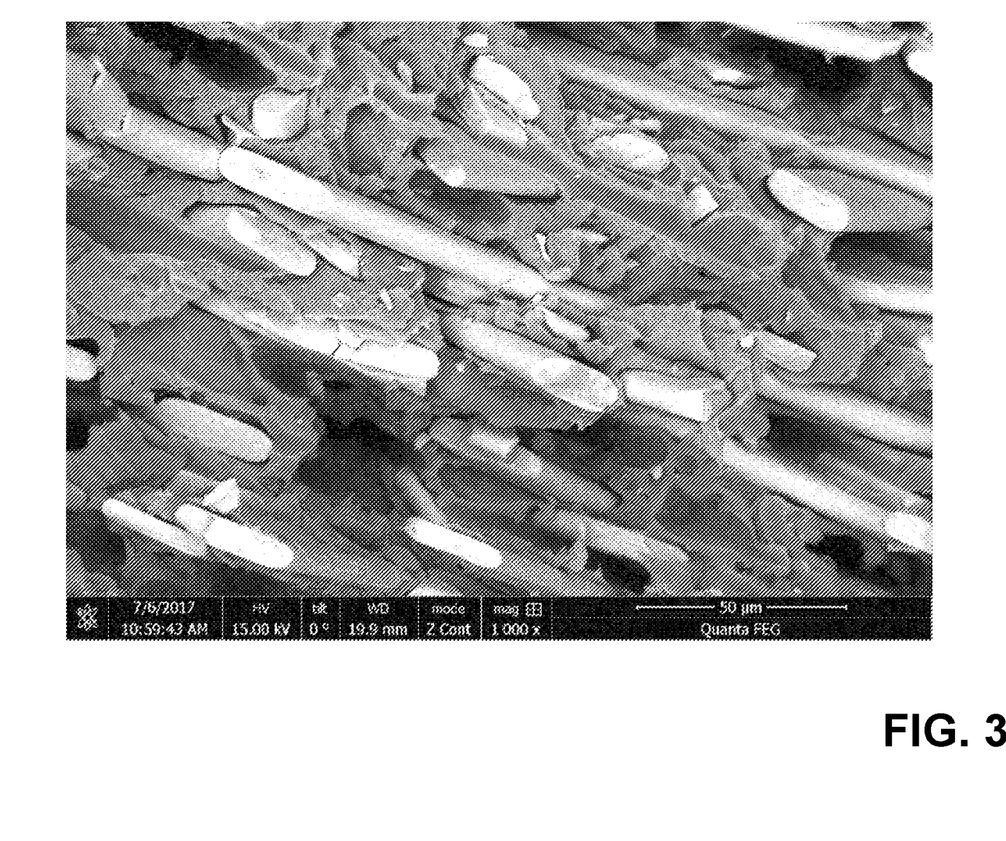
FIG. 3 is a SEM image of an inventive glass fiber and polymer base resin composition according to another aspect of the disclosure.

The interphase between glass fiber and polymer base resin was further studied using scanning electron micrography (SEM). FIG. 1 presents the SEM for comparative sample C3. FIG. 2 presents inventive sample E5. FIG. 3 presents inventive sample E4. The observed sample is the fractured sample after impact testing. For both C3 and E4, it can be observed that the bonding of resin with flat GF is not as good. This is evidenced by the apparent gap between GF and the polymer resin shown as the white areas that are not surrounded or coated by the sizing component having reactive aid. For E5, a better adhesion between the fiber and the resin was observed. The better adhesion is the bonding of glass fiber with the polymer resin and is evidenced by the apparent dark coating (sizing component) on the white areas (corresponding to the glass fiber). The improved bonding between resin and GF in E5 may correspond to improved impact performance due to efficient stress transfer from resin to fiber. In addition, the reactive aid reacts with the fiber and the resin thereby improving the dripping inhibition effect to improve the flame retardant performance.

Glass fibers (GF) were also used in compounds with Laser Direct Structuring (LDS) function. For the LDS compounds, LDS additives typically cause a reduction in impact performance; as a result impact modifiers are included. The examples, however, demonstrate that the GF3 with a special sizing of HDI and IDPI helps to achieve a more desirable impact performance for the impact modified LDS compounds. Comparative sample (C4) and inventive samples (E6) including a 30 wt. % GF loaded formulation were prepared from the components as shown in Table 5:

TABLE 5

Properties of samples.

| Item | Item Description | Unit | C4 | E6 |
|---|---|---|---|---|
| PC3 | Branched THPE, HBN Endcapped PC | % | 9.9 | 9.9 |
| HFD PC | Sebacic acid/BPA Copolymer, low Mw | % | 32.6 | 32.6 |
| HFD PC2 | Sebacic acid/BPA/PCP Poyestercarbonate, high Mw | % | 15.9 | 15.9 |
| IM2 | Acrylic polymer impact modifier, pellets | % | 5 | 5 |
| LDS | Lazerflair 8840 (article number 1.41055) | % | 5 | 5 |
| GF1 | Nittobo, CSG 3PA-830, flat fiber | % | 30 | |
| GF3 | CPIC Flat GF, 307AT | % | | 30 |
| STAB3 | MZP | % | 0.3 | 0.3 |
| PETS | Pentaerythritol tetrastearate | % | 0.5 | 0.5 |
| STAB1 | Phosphite stabilizer | % | 0.1 | 0.1 |
| STAB2 | Hindered Phenol Anti-oxidant | % | 0.1 | 0.1 |
| STAB5 | Joncryl ADR 4468 | % | 0.1 | 0.1 |
| STAB4 | Phosphorous acid | % | 0.01 | 0.01 |
| Result | | | | |
| MFR | 300° C./1.2 kg, ASTM D1238 | g/10 min | 20.78 | 18.67 |
| Notched Izod impact strength | 23° C., ASTM D256 | J/m | 124 | 139 |
| Unnotched Izod impact strength | 23° C., ASTM D256 | J/m | 419 | 489 |
| Flexural Modulus | ASTM D790, 1.27 mm/min | M pa | 7270 | 7230 |
| Flexural Stress at break | ASTM D790 at break | M pa | 141 | 146 |
| Heat deflection temperature | 3.2 mm, 1.8 Mpa, ASTM D648 | ° C. | 121 | 120 |
| Tensile modulus | ASTM D638, 5 mm/min | M pa | 8363 | 8500 |
| Tensile stress | ASTM D638 @ Break | M pa | 96 | 98 |
| Tensile elongation | ASTM D638 @ Break | % | 2.1 | 2.3 |
| Dielectric Constant | 1.9 GHz | | 3.53 | 3.53 |
| Dielectric Factor | 1.9 GHz | | 0.01276 | 0.01281 |

As shown in Table 5, inventive sample (E6) including 30 wt. % GF3 and reactive aids HDI and IDPI had significantly improved impact strength (12% higher NII; 17% higher UNII) as compared to the comparative sample (C4).

Figure 4:
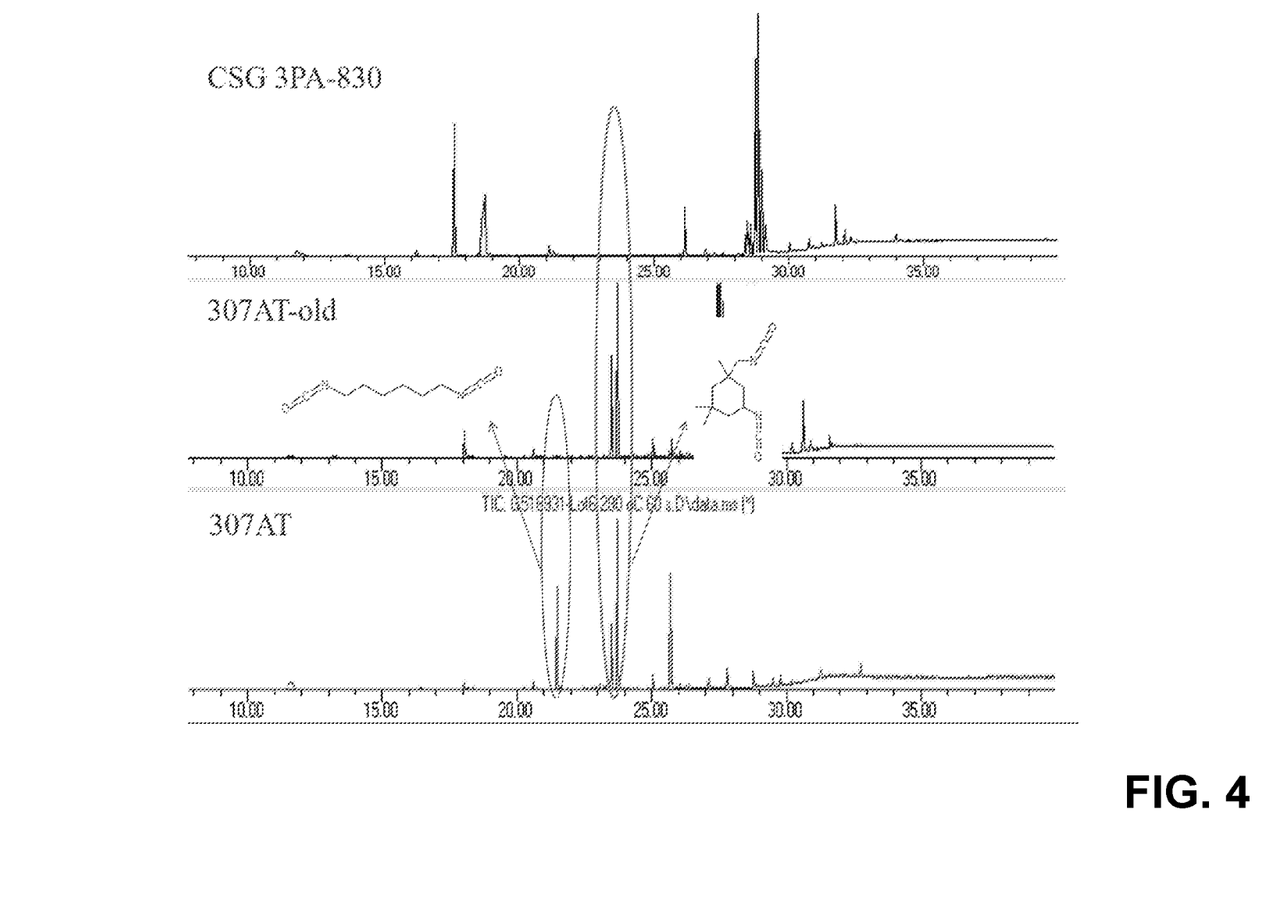
FIG. 4 are gas chromatograph results for different types of glass fibers described in the disclosure.

A gas chromatography mass spectroscopy analysis was also performed for the different samples at 280° C. for 60 seconds. The gas chromatographs are presented in FIG. 4. As shown, two peaks at approximately 21.5 and 23.5 correspond to HDI and IDPI respectively. The peaks demonstrate that 307AT-old glass fiber only has IDPI, while 307AT glass fiber has both HDI and IDPI reactive agents as reactive sizing aid.

The above description is intended to be illustrative, and not restrictive. For example, the above-described examples (or one or more aspects thereof) may be used in combination with each other. Other aspects can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

That which is claimed is:

1. A composition comprising:
   a polymer base resin comprising polycarbonate, a polycarbonate copolymer, or a mixture thereof;

from 10 wt. % to 60 wt. % of a fiber filler comprising a sizing agent component and a diisocyanate component as a coating, wherein the sizing agent component is present in an amount of from 0.1 wt. % to 2 wt. % based on the weight of the fiber filler, wherein the diisocyanate component comprises hexamethylene diisocyanate; and an additive, wherein a molded article formed from the composition exhibits a notched Izod impact strength of 140 to 190 Joules/meter (J/m), and an unnotched Izod impact strength of 500 to 1200 J/m when tested in accordance with ASTM D256.

2. The composition according to claim 1, wherein the composition comprises:

from 15 wt. % to 89.5 wt. % of the polymer base resin; and from 0.5 wt. % to 20 wt. % of the additive.

3. The composition according to claim 1, wherein the fiber filler comprises glass fiber, carbon fiber, basalt fiber, or a combination thereof.

4. The composition according to claim 3, wherein the fiber filler comprises glass fiber.

5. The composition according to claim 1, wherein the sizing agent comprises epoxy, polyurethane, nylon, polypropylene, polyimide, phenoxy resin, ethylene/propylene maleic anhydride copolymer resin, or a combination thereof.

6. The composition according to claim 1, wherein the diisocyanate component further comprises isophorone diisocyanate.

7. The composition according to claim 1, wherein the polymer base resin further comprises polyester resin.

8. The composition according to claim 1, wherein the polymer base resin further comprises an aliphatic or aromatic polyamide.

9. The composition according to claim 1, wherein the diisocyanate component interacts with functional endgroups of the polymer base resin.

10. The composition according to claim 1, wherein the fiber filler comprises glass fibers, and the composition has a notched Izod impact strength that is at least 12% higher than that of a comparative composition that includes glass fibers that do not include the diisocyanate component.

11. The composition according to claim 1, further comprising a flame retardant additive and wherein the composition exhibits a flame retardance of at least V0 at 1.0 mm when tested in accordance with UL 94.

12. The composition according to claim 1, wherein the composition has improved adhesion between the polymer base resin and the fiber filler as compared to a comparative composition that includes a fiber filler that does not include the diisocyanate component.

13. The composition according to claim 1, wherein:

the sizing agent comprises epoxy, polyurethane, phenoxy resin, or a combination thereof; and the diisocyanate component further comprises isophorone diisocyanate and hexamethylene diisocyanate.

14. The composition according to claim 1, wherein the sizing agent comprises BPA-epoxy resin and the diisocyanate component further comprises isophorone diisocyanate and hexamethylene diisocyanate.

15. The composition according to claim 1, wherein the composition comprises from about 20 wt. % to about 60 wt. % of the fiber filler.

* * * * *